United States Patent
Kaster

(10) Patent No.: US 12,248,578 B2
(45) Date of Patent: Mar. 11, 2025

(54) DIGITAL SHADOWS FOR REMOTE ATTESTATION OF VEHICLE SOFTWARE

(71) Applicant: Robert Bosch GmbH, Stuttgart (DE)

(72) Inventor: Robert M. Kaster, White Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 17/973,033

(22) Filed: Oct. 25, 2022

(65) Prior Publication Data

US 2024/0134987 A1  Apr. 25, 2024
US 2024/0232362 A9  Jul. 11, 2024

(51) Int. Cl.
*G06F 21/00* (2013.01)
*G06F 21/57* (2013.01)

(52) U.S. Cl.
CPC ...... *G06F 21/572* (2013.01); *G06F 2221/033* (2013.01)

(58) Field of Classification Search
CPC .. G06F 21/572; G06F 2221/033; G06F 21/57; G06F 21/565; H04L 9/0866; H04L 9/3242; H04L 2209/84; H04L 9/3247; H04L 63/126; H04L 63/123; H04L 67/12
See application file for complete search history.

(56) References Cited

U.S. PATENT DOCUMENTS

| | | | |
|---|---|---|---|
| 8,327,153 B2 | 12/2012 | Lee et al. | |
| 9,069,042 B2 * | 6/2015 | Raina | G11C 29/12 |
| 10,153,908 B2 | 12/2018 | Kravitz et al. | |
| 10,484,349 B2 * | 11/2019 | Lei | H04W 4/14 |
| 10,762,475 B2 | 9/2020 | Song et al. | |
| 10,931,458 B2 * | 2/2021 | Oguchi | H04L 67/12 |
| 11,204,750 B2 | 12/2021 | Tatourian | |
| 11,799,662 B2 * | 10/2023 | Shahar | H04L 9/3263 |

(Continued)

FOREIGN PATENT DOCUMENTS

| WO | WO-2020125839 A1 * | 6/2020 | ............. G06F 21/31 |
| WO | WO-2022067731 A1 * | 4/2022 | ........... G06F 21/562 |

OTHER PUBLICATIONS

International Search Report and Written Opinion for Application No. PCT/EP2023/079331 dated Jan. 3, 2024 (14 pages).

(Continued)

*Primary Examiner* — Kendall Dolly
(74) *Attorney, Agent, or Firm* — Michael Best & Friedrich LLP

(57) ABSTRACT

Systems and methods for performing vehicle software attestation. One system includes an electronic control unit (ECU) master included in a vehicle and a verifier system. The ECU master receives a digital shadow request generated by the verifier system and generates a digital shadow. The digital shadow is based on a unique, one-way identifier of a program memory space of the ECU master and a unique, one-way identifier of a program memory space of each of a plurality of other ECUs included in the vehicle. The ECU master transmits the digital shadow to the verifier system. The verifier system receives the digital shadow from the ECU master as a first digital shadow, receives a second digital shadow from a digital twin representing software installed in the ECU master and each of the plurality of other ECUs, and determines whether the first digital shadow matches the second digital shadow.

18 Claims, 9 Drawing Sheets

(56) References Cited

U.S. PATENT DOCUMENTS

| | | | |
|---|---|---|---|
| 2017/0180989 A1* | 6/2017 | Etzel | G06F 21/602 |
| 2017/0366521 A1* | 12/2017 | Lei | H04W 4/14 |
| 2018/0254903 A1* | 9/2018 | Bardelski | G06F 21/72 |
| 2020/0195426 A1* | 6/2020 | Dreasher | H04L 9/0838 |
| 2021/0312723 A1* | 10/2021 | Santos | G07C 5/008 |
| 2022/0353075 A1* | 11/2022 | Bond | H04L 9/0866 |
| 2024/0028731 A1* | 1/2024 | Bessiere | G06F 21/572 |
| 2024/0073037 A1* | 2/2024 | McFarland, Jr. | H04L 9/3268 |
| 2024/0134987 A1* | 4/2024 | Kaster | G06F 21/565 |

OTHER PUBLICATIONS

Oham et al., "B-FERL: Blockchain based framework for securing smart vehicles," Information Processing and Management, 2021, vol. 58, 102426, 15 pages.

* cited by examiner

DIGITAL SHADOWS FOR REMOTE ATTESTATION OF VEHICLE SOFTWARE

BACKGROUND

Vehicles include a large number of electronic control units (ECUs). Each ECU may execute software or firmware (collectively referred to herein as "software"), and the software may be updated overtime including via flash over the air (FOTA) updates. Software attestation generally refers to a trust establishment mechanism that allows a system (a verifier) to check the integrity of the program memory content of another system (a prover) against modification, such as, for example, modification by malicious code or modification of code impacting regulatory compliance.

SUMMARY

It is often difficult to for a party, with a justifiable need to know, to be confident that a vehicle has the correct software installed in each of the vehicle's electronic control units (ECUs). It is especially difficult for regulators and other third parties that do not have physical or reliable and secure network access to a vehicle or do not possess the complete software definition inside the vehicle, which vehicle and software manufacturers may not want to provide. Also, such third parties may need to check many vehicles and, hence, many modules. For example, there are approximately 1.4 billion vehicles in the world and each vehicle can have 50 or may be even 100 ECUs.

Accordingly, to solve these and other technical problems, examples, aspects, and features described herein use digital twins and digital shadows for vehicle software attestation. A digital twin is based on the idea that a digital informational construct about a physical system can be created as an entity on its own. This digital information is a "twin" of information embedded within the physical system itself and linked to the physical system through the lifecycle of the system, such that modifications to the physical system are also applied to the digital twin. Using digital twins, each original equipment manufacturer (OEM) maintains a digital copy of digital-twin enabled software installed in one or more ECUs for one or more vehicles to provide the ability to monitor operation, maintenance needs, and current status as a vehicle moves from manufacturing through its lifecycle.

As used herein, a digital shadow (DS) is a cryptographically unique one-way identifier of the software image of a vehicle. An identical value of the digital shadow is derived from the ECU present in a vehicle and from the digital twin when the software installed on each match. As the digital shadow is encrypted and a one-way identifier, the digital shadow can be shared with an untrusted authority as well as over untrusted networks while not divulging sensitive information about the ECU (the complete software definition), an adversary is not capable of determining the digital shadow fingerprint without the software, and an adversary cannot determine the software from knowledge of the digital shadow or the algorithm.

For example, one example provides a system for performing vehicle software attestation. The system includes an electronic control unit (ECU) master included in a vehicle, and a verifier system. The verifier system is configured to generate a digital shadow request, and transmit, to an address of the vehicle, the digital shadow request over a communication network. The ECU master is configured receive the digital shadow request, and generate a unique, one-way identifier of a program memory space of the ECU master. The ECU master is also configured to receive a unique, one-way identifier of a program memory space of each of a plurality of other ECUs included in the vehicle, generate a digital shadow based on the unique, one-way identifier of the program memory space of the ECU master and the unique, one-way identifier of the program memory space of each of the plurality of other ECUs, and transmit the digital shadow to the verifier system as a response to the digital shadow request. The verifier system is further configured to receive the digital shadow from the ECU master as a first digital shadow, receive a second digital shadow from a digital twin representing software installed in the ECU master and each of the plurality of other ECUs, determine whether the first digital shadow matches the second digital shadow, and, in response to the first digital shadow matching the second digital shadow, set the vehicle as passing software attestation.

Another example provides a method for performing vehicle software attestation. The method includes receiving, at an electronic control unit (ECU) master included in a vehicle, a digital shadow request from a verifier system, and generating, with the ECU master, a unique, one-way identifier of a program memory space of the ECU master. The method also includes receiving, at the ECU master, a unique, one-way identifier of a program memory space of each of a plurality of other ECUs included in the vehicle and generating, with the ECU master, a digital shadow based on the unique, one-way identifier of the program memory space of the ECU master and the unique, one-way identifier of the program memory space of each of the plurality of other ECUs. The method further includes transmitting, with the ECU master, the digital shadow to the verifier system over a communication network as a response to the digital shadow request.

Yet another example provides non-transitory computer-readable medium storing instructions executable by an electronic processor to perform a set of functions. The set of functions includes receiving a digital shadow request from a verifier system and, in response to receiving the digital shadow request, (i) generating a unique, one-way identifier of a program memory space of an electronic control unit (ECU) master included in a vehicle, (ii) receiving a unique, one-way identifier of a program memory space of each of a plurality of other ECUs included in the vehicle, (iii) generating a digital shadow based on the unique, one-way identifier of the program memory space of the ECU master and the unique, one-way identifier of the program memory space of each of the plurality of other ECUs, and (iv) transmitting the digital shadow to the verifier system over a communication network as a response to the digital shadow request.

Other aspects, features, and embodiments will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments and aspects of concepts that include the claimed subject matter and explain various principles and advantages of various aspects and embodiments.

Figure 1:
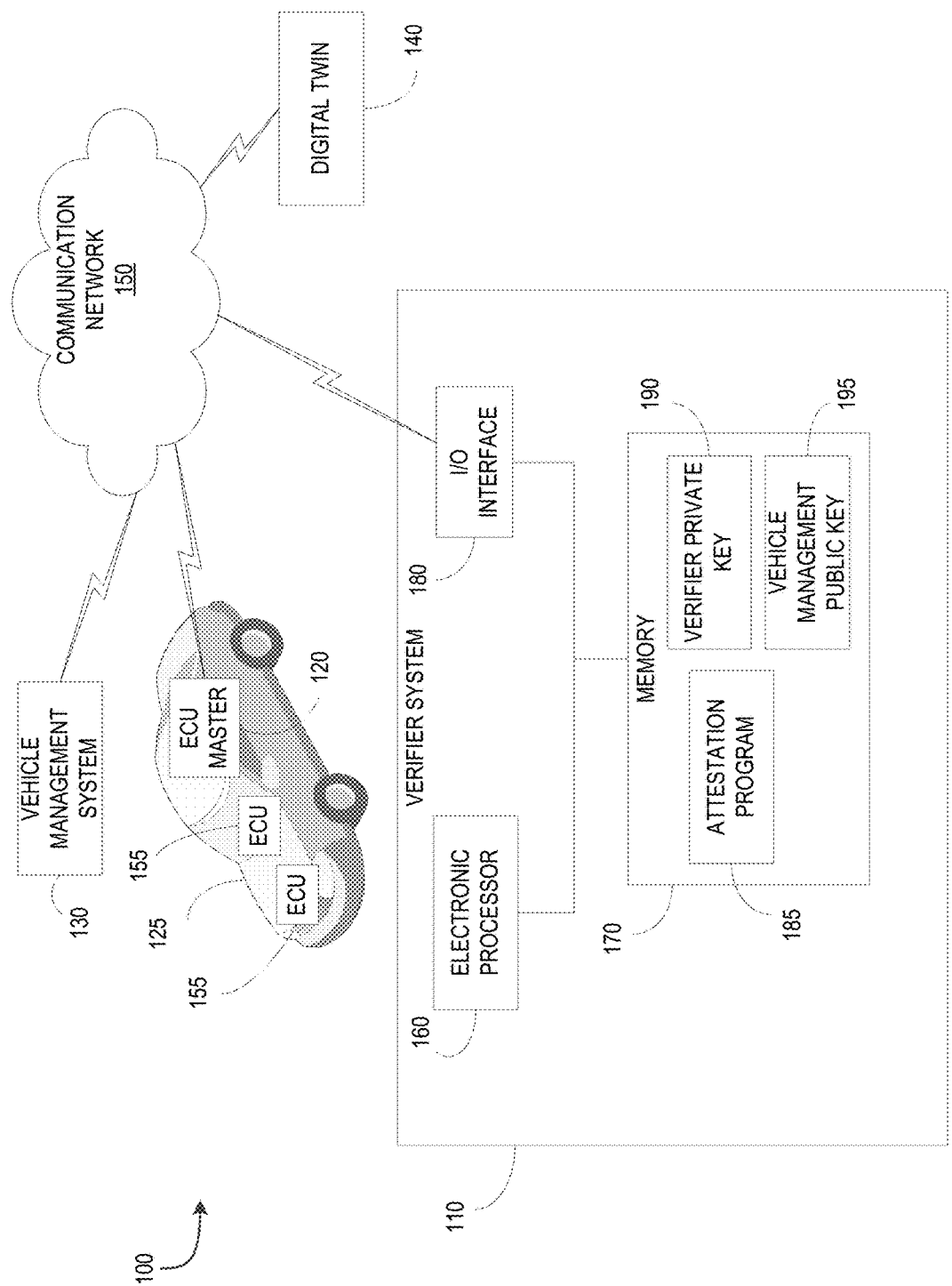
FIG. 1 is a block diagram of an attestation system, in accordance with some aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments and aspects.

The apparatus and method components have been represented where appropriate by conventional symbols in the drawings, showing only those specific details that are pertinent to understanding the embodiments and aspects of the claimed subject matter so as not to obscure the disclosure with details that will be readily apparent to those of ordinary skill in the art having the benefit of the description herein.

DETAILED DESCRIPTION

Before any embodiments, aspects, examples, and features are explained in detail, it is to be understood that the embodiments, aspects, examples, and features are not limited in their application to the details of construction and the arrangement of components set forth in the following description or illustrated in the following drawings. Other embodiments, aspects, examples, and features are possible and may be practiced or carried out in various ways.

It should also be noted that a plurality of hardware and software-based devices, as well as a plurality of different structural components may be used to implement embodiments, aspects, examples, and features. In addition, it should be understood that embodiments, aspects, examples, and features may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one example, the electronic-based aspects described herein may be implemented in software (for example, stored on non-transitory computer-readable medium) executable by one or more processors. As such, it should be noted that a plurality of hardware and software-based devices, as well as a plurality of different structural components may be utilized in various instances. For example, "control units" and "controllers" described in the specification can include one or more electronic processors, one or more physical memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

As described above, is it difficult for third parties (e.g., parties separate from the vehicle manufacturer, software provider, and vehicle owner or user) to verify the software image on a vehicle. As the amount of software installed on a vehicle and the ease of updating such software increases (e.g., via flash over the air (FOTA) updates), the difficulty of software attestation increases. Similarly, vehicle manufacturers and software providers are likely not open to sharing complete software with third parties, such as, for example, vehicle owners and government regulators. Furthermore, communicating with vehicles over unreliable or untrusted communication network adds an additional layer of trust requirements.

Accordingly, aspects described herein use digital twins and digital shadows to perform remote software attestation. The digital twins, which may be maintained by vehicle manufacturers or other parties, such as, for example, vehicle or vehicle equipment original equipment manufacturers (OEMs), software providers, or the like, are a digital copy of the software contained in each ECU of each vehicle. The digital shadow is a cryptographically unique one-way identifier of the software image. As described in more detail below, a third party (e.g., a regulator) can communicate with both a vehicle and the vehicle's digital twin (using private/public key encryption or other secure communication methods) to request a digital shadow. In some aspects, the vehicle and the associated digital twin generate the digital shadow by representing the vehicle ECUs as nodes within a tree, such as, for example, a Merkle tree. A Merkle tree allows for efficient and secure verification of the contents of a data structure and, in particular, is a tree in which every leaf node represents a cryptographic hash of a data block, and every node that is not a leaf node (a parent node) is labeled with the cryptographic hash of the labels of its child nodes. For example, with each node of a Merkle tree representing an ECU within a vehicle architecture of ECUs, a cryptographically unique one-way identifier of the memory space of the ECU represented by each leaf node (such as, for example, a message authentication code (MAC), a checksum, error detection code, hash, keyed hash, or the like) is generated using a unique device key associated with the represented ECU and this generated node identifier is transmitted to each parent node of the leaf node. Each parent node concatenates the node identifier received from each child node with a similar identifier determined for the ECU represented by the parent node to create, using a unique device key of the ECU represented by the parent node, a node identifier for the parent node. The node identifier calculated by the top node in the tree (the node with no parent nodes) represents the digital shadow of the vehicle software image and is transmitted to the third party (e.g., a regulator). The third party compares the digital shadow received from the vehicle to the digital shadow received from the digital twin, which generates a digital shadow using the same vehicle architecture Merkle tree to determine whether the vehicle passes or fails software attestation.

For example, FIG. 1 is a block diagram of an attestation system 100, in accordance with some aspects. As illustrated in FIG. 1, the attestation system 100 includes a verifier system 110, an electronic control unit (ECU) master 120 included in a vehicle 125, a vehicle management system 130, and a digital twin 140. The verifier system 110, the ECU master 120, the vehicle management system 130, and the digital twin 140 may communicate over one or more communication networks 150. The one or more communication networks 150 include one or more wireless connections, wired connections, or combinations of both. The one or more communication networks 150 may be implemented using a wide area network, for example, the Internet (including public and private IP networks), a Long Term Evolution (LTE) network, a 4G network, 5G network and one or more local area networks, for example, a Bluetooth™ network or Wi-Fi network, and combinations or derivatives thereof. It should be understood that, in some aspects, the components illustrated in FIG. 1 may communicate using the same communication network 150 or different communication networks 150. For example, in some aspects, the verifier system 110 and the vehicle management system 130 may communicate over a different communication network than the verifier system 110 uses to communicate with the ECU master 120, the digital twin 140, or both. It should also be understood that the components included in the attestation system 100 may communicate through one or more intermediary devices, such as, for example, routers, gateways, firewall, and the like (not shown). Also, in some aspects, one or more pairs of components included in the attestation system 100 may communicate over dedicated wired or wireless connections.

The verifier system 110 is associated with an entity, such as a regulator, that desires to verify a software image of the vehicle 125. The verifier system 110 includes one or more computing devices, such as, for example, one or more servers.

The ECU master 120 is a designated point of contact within the vehicle 125 for the verifier system 110. In some aspects, the ECU master 120 is configured to provide functionality in addition to communicating with the verifier system 110. For example, in some aspects, the ECU master 120 is a telematics ECU included in the vehicle. As illustrated in FIG. 1, the vehicle 125 includes one or more additional ECUs (referred to herein collective as "other ECUs 155" or individually as "ECU 155"). The ECU master 120 may communicate with the other ECUS 155 via one or more wired or wireless communication channels or connections, such as for example a bus included in the vehicle 125 (e.g., a controller area network (CAN) bus).

The vehicle management system 130 includes one or more computing devices, such as, for example, one or more servers. The vehicle management system is associated with an entity, such as, for example, a vehicle manufacturer, OEM, software provider, or the like, and stores or has access to identifying information of the vehicle 125, such as, for example, a vehicle identification number (VIN) and an identifier, such as, for example, a communication address, of the ECU master 120 or another component of the vehicle 125 that allows for remote communication with the vehicle 125 over the one or more communication networks 150.

As described above, the digital twin 140 is a digital copy of software contained in one or more ECUs included in the vehicle 125 (e.g., the ECU master 120 and each of the one or more other ECUs 155). In some aspects, the digital twin 140 is included as part of the vehicle management system 130 or may be associated with the same entity associated with the vehicle management system 130. For example, the digital twin 140 may be maintained by an OEM, which allows the OEM to monitor operation, maintenance needs, and a current status of the vehicle 125 as the vehicle moves from manufacturing through its lifecycle.

It should be understood that although the attestation system 100 illustrated in FIG. 1 includes a single vehicle management system, a single vehicle 125 and associated ECU master 120, and a single digital twin 140, the attestation system 100 can include multiple vehicle management systems 130 and multiple digital twins 140, which allows the verifier system 110 to verify the software image of multiple vehicles (e.g., through communication with an ECU master 120 included in each of a plurality of vehicles). Accordingly, the configuration illustrated in FIG. 1 is for illustration only and should not be considered limiting. Also, in some aspects, the attestation system 100 includes multiple verifier systems 110 as described herein, such as, for example, when there are multiple entities verifying the same or different software installed in one or more vehicles 125.

As noted above, the verifier system 110 includes one or more computing devices, such as, for example, one or more servers. For example, as illustrated in FIG. 1, in some aspects, the verifier system 110 includes an electronic processor 160, a memory 170, and an input/output (I/O) interface 180. It should be understood that the verifier system 110 may include other components (not shown), including, for example, power management components, protection components, human machine interface (HMI) components. Similarly, in some aspects, the verifier system 110 may include multiple processors, memory modules, interfaces, or a combination thereof.

The electronic processor 160, which may include, for example, a programmable electronic microprocessor, microcontroller, or similar electronic data processing device) is communicatively connected to the memory 170 and the I/O interface 180. The electronic processor 160, in coordination with the memory 170 and the I/O interface 180, is configured to implement, among other things, the methods described herein.

The memory 170 may be made up of one or more non-transitory computer-readable media and includes at least a program storage area and a data storage area. The program storage area and the data storage area can include combinations of different types of memory, such as read-only memory ("ROM"), random access memory ("RAM"), flash memory, or other suitable memory devices.

The electronic processor 160 sends and receives information (for example, from the memory 170, the I/O interface 180, or a combination thereof) and processes the information by executing one or more software instructions or modules, capable of being stored in the memory 170 or another non-transitory computer readable medium. The software can include firmware, one or more applications, program data, filters, rules, one or more program modules, and other executable instructions. The electronic processor 160 is configured to retrieve from the memory 170 and execute, among other things, software for performing software attestation as described herein. For example, as illustrated in FIG. 1, in some aspects, the memory 170 stores, among other things, an attestation program 185, which, when executed by the electronic processor 160, operates as described herein to perform remote software attestation of the vehicle 125. As illustrated in FIG. 1, in some aspects, the memory 170 (or a separate memory module accessible by the electronic processor 160) also stores a verifier private key 190 and a vehicle management public key 195. As described in more detail below, the keys 190 and 195 allow the verifier system 110 to securely communicate with other components of the attestation system 100 using public key encryption. It should be understood that other forms of secure communication may be established and used by one or more components of the attestation system 100 and the use of public key encryption should not be considered limiting. For example, in some aspects, one or more components of the attestation system 100 may communicate using symmetric keys. Establishment and exchange of keys in a public key encryption system is known and not described herein for sake of brevity. Accordingly, with respect to the methods described herein, it should be assumed that key pairs have been established and distributed accordingly for use within the attestation system 100. Furthermore, it should be understood that the use of public key encryption or other mechanisms for secure communications between components of the system 100 is optional. For example, in some aspects, one or more of the components of the system 100 may communicate with using public key encryption, digital signatures, or both and may rely on security features of the communication network 150, the transmitted data, or the like to provide for data security.

The I/O interface 180 transmits and receives information from devices external to the verifier system 110 (for example, over the one or more communication networks 150). In some aspects, the I/O interface 180 includes one or transmitters, receivers, or transceivers for communicating wirelessly with external devices. Similarly, in some aspects, the I/O interface 180 includes one or more ports for receiving a cable, such as, for example, an Ethernet cable or other type of cable that allows the verifier system 110 to communicate with external devices over a wired connection. It should be understood that the I/O interface 180 can communicate with one or more external devices through one or more wired connections, wireless connections, or a combination thereof.

The vehicle management system 130 may include similar components as illustrated for the verifier system 110. For example, although not illustrated in FIG. 1, the vehicle management system 130 may include one or more electronic processors, one or more memory modules, and one or more I/O interfaces as described above with respect to the verifier system 110. As compared to the verifier system 110, a memory included in the vehicle management system 130 may store a vehicle management private key and a verifier public key, which as noted above, allows the vehicle management system 130 to securely communicate with external devices and systems, such as, for example, the verifier system 110. As noted above, a memory included in the vehicle management system 130 may store an identifier of the vehicle 125, such as, for example, a VIN, and an associated identifier, such as, for example, an address, of the ECU master 120. In some aspects, the vehicle management system 130 may store additional information regarding the vehicle 125, one or more ECUs included in the vehicle 125, the associated digital twin 140, or a combination thereof. For example, in some aspects, the vehicle management system 130 may store an identifier of the digital twin 140 associated with the vehicle 125, which the vehicle management system 130 may provide to the verifier system 110 to identify what digital twin 140 the verifier system 110 should use to perform software attestation for the vehicle 125.

Figure 2:
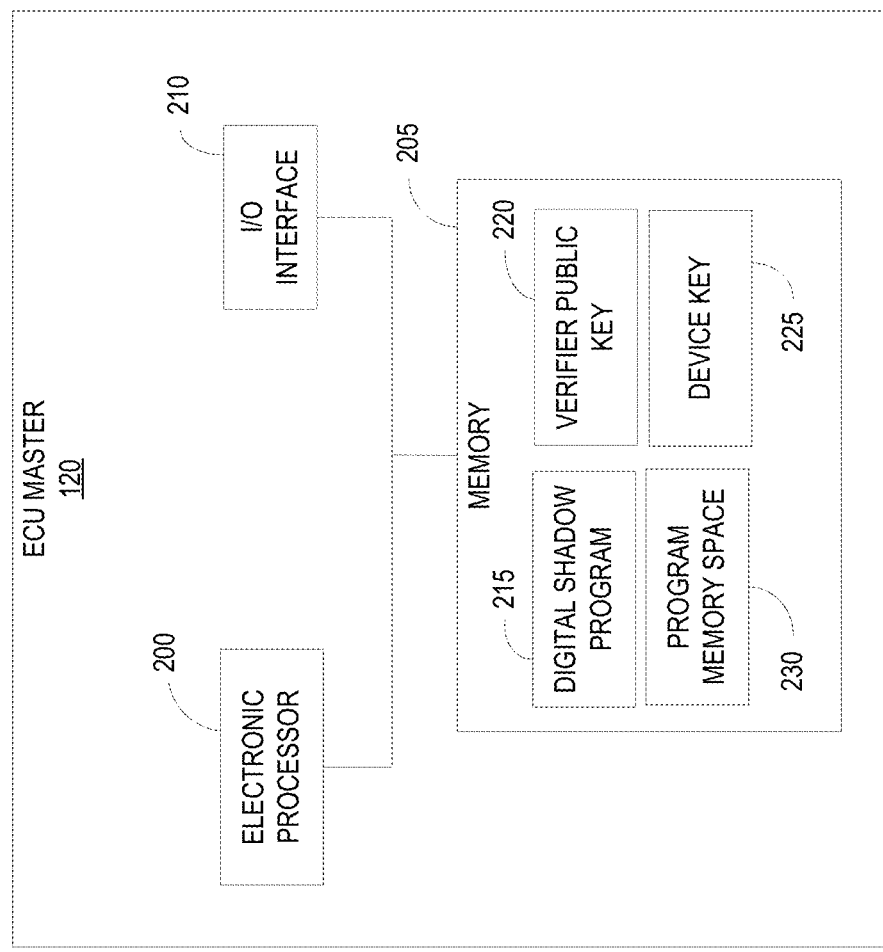
FIG. 2 schematically illustrates a vehicle telematics master included in the attestation system of FIG. 1, in accordance with some aspects.

The ECU master 120 may also include similar components as the verifier system 110. For example, as illustrated in FIG. 2, in some aspects, the ECU master 120 includes an electronic processor 200, a memory 205, and an I/O interface 210, which may function similar to the electronic processor 160, the memory 170, and the I/O interface 180 described above with respect to the verifier system 110. As noted for the verifier system 110, the schematic illustration of components included in the ECU master 120 is provided as one example configuration and the ECU master 120 may include additional components.

As illustrated in FIG. 2, the memory 205 included in the ECU master 120 stores a digital shadow program 215, which, when executed by the electronic processor 200, operates as described herein to generate a digital shadow, such as, for example, in response to receiving a request from the verifier system 110. As illustrated in FIG. 2, in some aspects, the memory 205 (or a separate memory module accessible by the electronic processor 200) also stores a verifier public key 220 and a device key 225. As described in more detail below, the verifier public key 220 allows the ECU master 120 to authenticate data received from the verifier system 110, such as, for example, through the use of a digital signature. The device key 225 is unique to the ECU master 120 and, as described below, is used by the ECU master 120 to create a digital shadow, and the digital twin of the ECU master 120 uses the same unique device key 225 to similarly create a digital shadow.

As illustrated in FIG. 2, the memory 205 also includes program memory space 230 storing software executable by the electronic processor 200. The software stored within the program memory space 230 represents the software the verifier system 110 desires to verify. It should be understood that the components illustrated in FIG. 2 as being included in the memory 205 may be distributed among multiple memory modules of the ECU master 120 and is not limited to being stored within the same module.

Although not illustrated, the one or more other ECUs 155 included in the vehicle 125 include similar components as the ECU master 120, including the digital shadow program 215 (or a version thereof), a unique device key, and a program memory space storing software the verifier system 110 desires to verify. As described in more detail below, rather than communicating with the verifier system 110 directly, these other ECUs 155 included in the vehicle 125 communicate with the ECU master 120 (directly or indirectly), wherein the ECU master 120 is configured to a complete digital shadow for the vehicle 125, which the ECU master 120 transmits to the verifier system 110.

Figure 3:
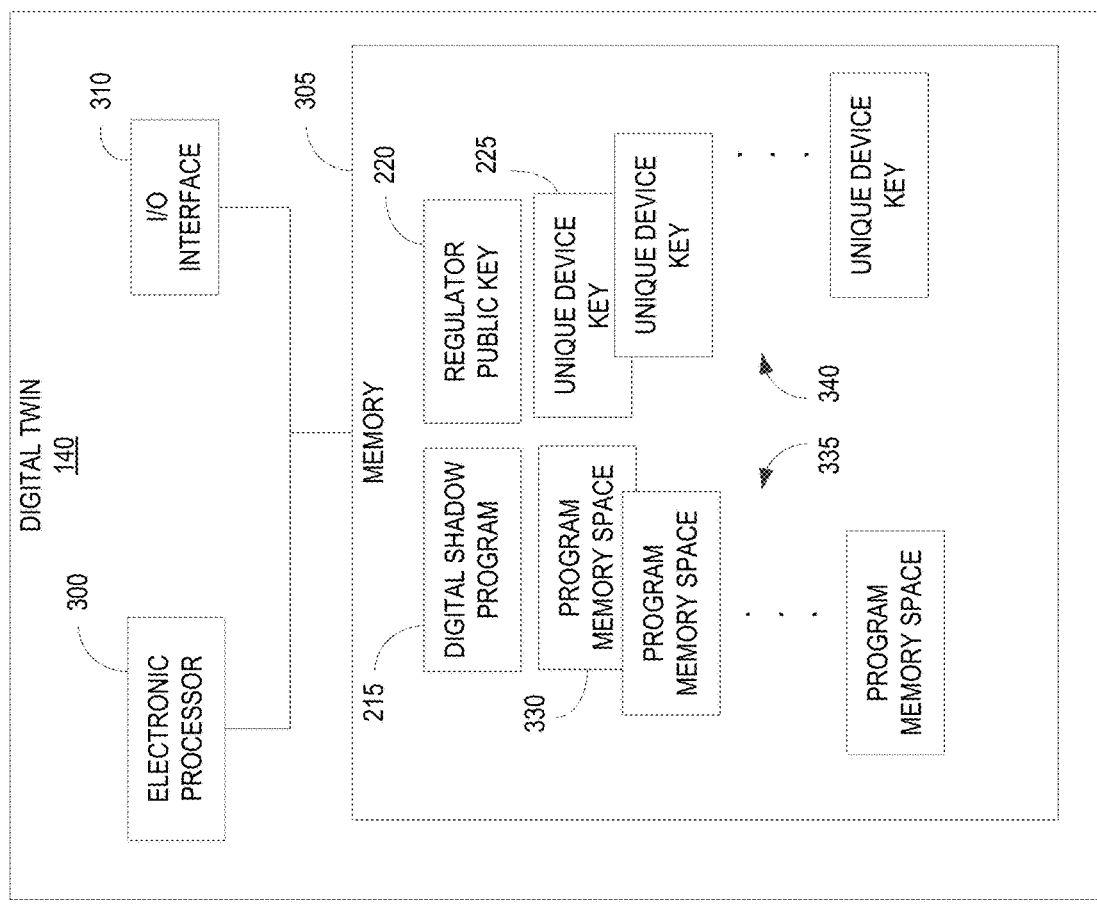
FIG. 3 schematically illustrates a digital twin included in the attestation system of FIG. 1, in accordance with some aspects.

FIG. 3 schematically illustrates the digital twin 140 included in the attestation system 100, in accordance with some aspects. Like the ECU master 120, the digital twin 140 includes an electronic processor 300, a memory 305, and an I/O interface 310, which may function similar to the electronic processor 200, the memory 205, and the I/O interface 210 described above with respect to the ECU master 120. As noted for the ECU master 120, the schematic illustration of components included in the digital twin 140 is provided as one example configuration and the digital twin 140 may include additional components and the components of the digital twin 140 illustrated in FIG. 3 may be distributed among multiple computing devices. For example, in some aspects, the digital twin 140 is maintained as part of one or more database systems, wherein a device (electronic processor) separate from the digital twin 140, such as, for example, the vehicle management system 130, may access the database system to generate a digital shadow as described herein. Accordingly, the digital twin 140 may be implemented through the use of a plurality of computing devices.

As illustrated in FIG. 3, the memory 305 included in the digital twin 140 stores the digital shadow program 215, which, when executed by the electronic processor 300, operates as described herein to generate a digital shadow, such as, for example, in response to receiving a request from the verifier system 110. In some aspects, the digital shadow program 215 executed by the digital twin 140 is identical to the digital shadow program 215 executed by the ECU master 120. However, the digital shadow program 215 executed by the digital twin 140 may also differ from the digital shadow program 215 executed by the ECU master 120 to account for the fact that the digital twin 140 digitally represents the software of multiple ECUs included in the vehicle 125 and, thus, may build a digital shadow differently from the ECU master 120, which communicates with the other ECUs in the vehicle 125 to generate the digital shadow. However, even if the digital shadow programs 215 executed by the digital twin 140 and the ECU master 120 differ, the resulting digital shadow created by each program 215 should match when software installed on the vehicle 125 matches software maintained in the digital twin 140.

As illustrated in FIG. 3, in some aspects, the memory 305 (or a separate memory module accessible by the electronic processor 300) also stores the verifier public key 220 and the device key 225 and includes the program memory space 330. As previously noted, the verifier public key 220 allows the digital twin 140 to authenticate data received from the verifier system 110, such as, for example, through the use of a digital signature. As also previously noted, the device key 225 is unique to the ECU master 120 and, as described below, is used by the digital twin 140 to create a digital shadow. The program memory space 330 stores the software that should be installed in the program memory space 230 of the ECU master 120 and similar to how the ECU master 120 creates a digital shadow of the program memory space 230, the digital twin 140 creates a digital shadow of the program memory space 330. When the program memory space 230 and the program memory space 330 stores the same software, the created digital shadows match.

As illustrated in FIG. 3, as the digital twin 140 represents the software installed in the vehicle 125 across multiple ECUs (not just the ECU master 120), the digital twin 140 also includes the program memory space (collectively referred to as the program memory spaces 340 or individually as a program memory space 340) of the one or more other ECUs 155 included in the vehicle 125, wherein each program memory space 340 stores the software that should be installed in the respective other ECU 155 of the vehicle 125. Similarly, the digital twin 140 stores the unique device key (collectively referred to as the unique device keys 345 or individually as a unique device key 345) for each such other ECU 155. It should be understood that the components illustrated in FIG. 3 as being included in the memory 305 may be distributed among multiple memory modules of the digital twin 140 and is not limited to being stored within the same module or even on the same device.

Figure 4:
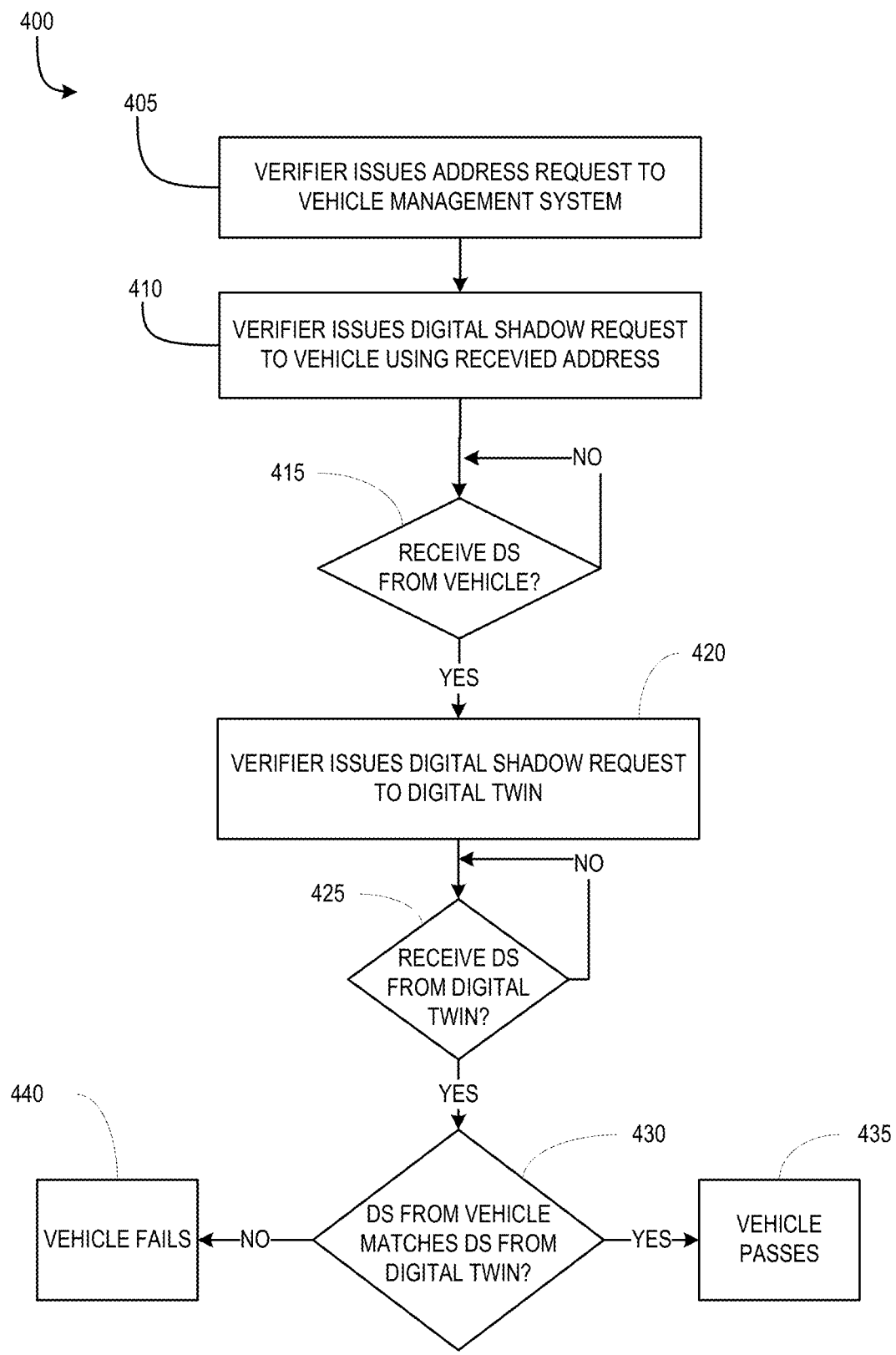
FIG. 4 is a flowchart of an example method for requesting and verifying digital shadows from the vehicle telematics master and the digital twin included in the attestation system of FIG. 1, in accordance with some aspects.

FIG. 4 is a flowchart of an example method 400 for requesting and verifying digital shadows from the ECU master 120 and the digital twin 140 included in the attestation system 100, in accordance with some aspects. The method 400 is described herein as being performed by the verifier system 110 and, in particular, via execution of the attestation program 185 by the electronic processor 160.

Figure 5:
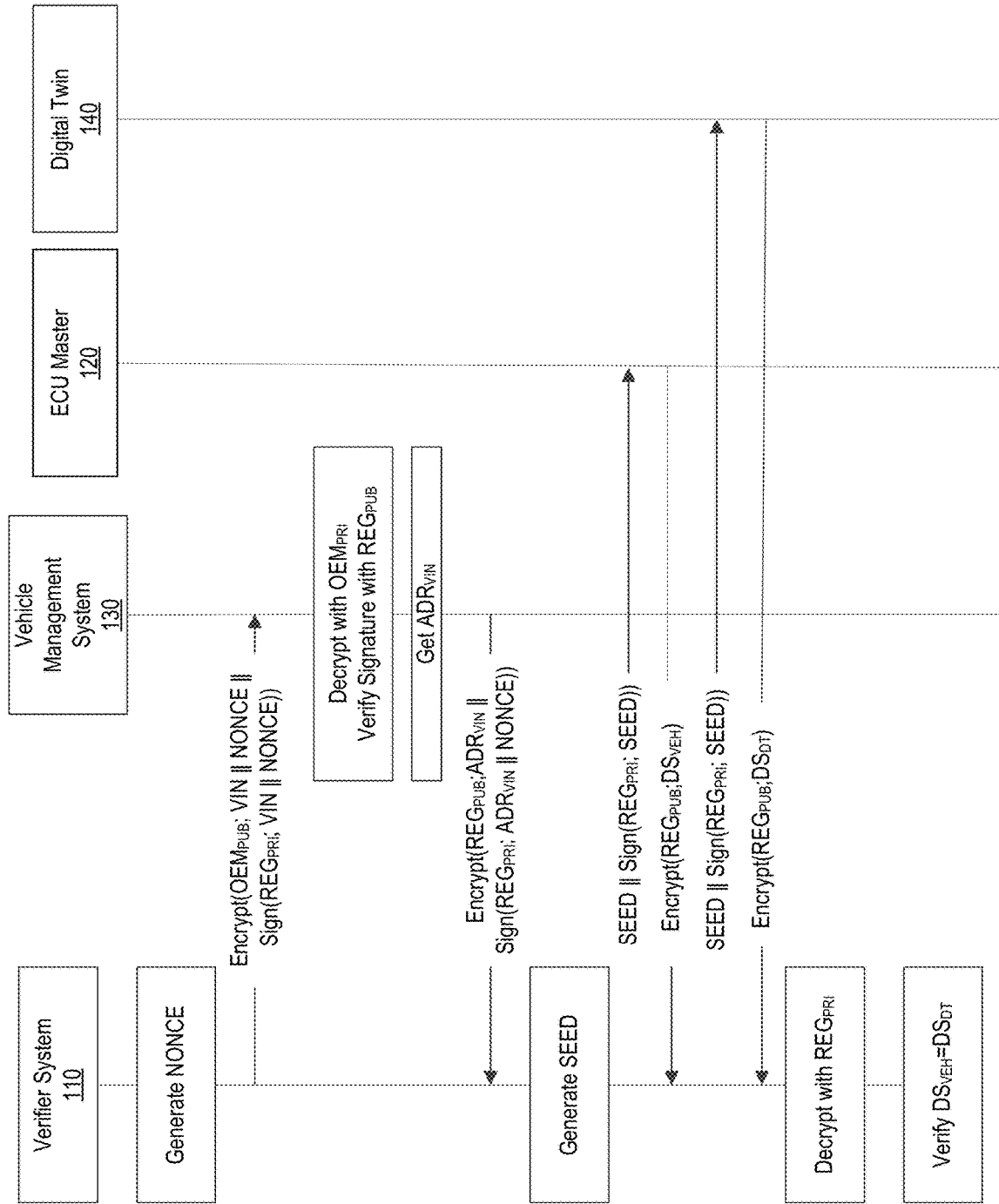
FIG. 5 is a sequence diagram representing the example method of FIG. 4, in accordance with some aspects.

As illustrated in FIG. 4, in some aspects, the method 400 includes the verifier system 110 issuing an address request to the vehicle management system 130 (at block 405). The sequence diagram in FIG. 5 and Algorithm 1 set forth below (where an OEM represents the vehicle management system 130 and a regulator represents the verifier system 110 as one example) provide further details regarding the method 400 and, in particular, the address request. As illustrated in FIG. 5, the verifier system 110 may request an address by generating (through execution of the attestation program 185 by the electronic processor 160), an address request. In some aspects, the address request includes an identifier of the vehicle 125, such as, for example, the VIN of the vehicle 125, and a random nonce. The verifier system 110 signs the address request with the verifier private key 190 ($REG_{PRI}$) (to create a signed address request) and encrypts the signed address request (concatenated with the identifier and the nonce in plaintext) with the public key 195 associated with the vehicle management system 130 ($OEM_{PUB}$) (to create an encrypted address request). The verifier system 110 transmits the encrypted address request to the vehicle management system 130 over the communication network 150.

The vehicle management system 130 (through execution of an attestation program executed by an electronic processor of the vehicle management system 130) receives the encrypted address request, decrypts the encrypted address request with the private key associated with the vehicle management system 130 ($OEM_{PRI}$), and verifies the signed address request via a public key associated with the verifier system 110 ($REG_{PUB}$). The vehicle management system 130 may verify the signed address request by decrypting the signed address request with the public key associated with the verifier system 110 ($REG_{PUB}$) to uncover the vehicle identifier and the nonce, which the vehicle management system 130 can compare to the plaintext versions also included in the address request. As described in more detail below, the vehicle management system 130 uses the nonce obtained from the decrypted address request) to authenticate itself with the verifier system 110 by sending the uncovered nonce back to the verifier system 110 in an address response.

In response to verifying the signed address request, the vehicle management system 130 determines, based on stored data, an identifier (address, $ADR_{VIN}$) of the ECU master 120 installed in the vehicle 125 identified by the identifier included in the address request and generates an address response. As illustrated in FIG. 5, in some aspects, the address response includes the identifier of the ECU master 120 and the random nonce included in the address request. As noted above, the vehicle management system 130 may return the random nonce in the address response to prove the verifier system 110 that the vehicle management system 130 was able to uncover the provided random nonce and, thus, is the authorized vehicle management system 130 (has access to the private key associated with the vehicle management public key 195).

The vehicle management system 130 signs the created address response the private key associated with the vehicle management system 130 ($OEM_{PRI}$) (to create a signed address response) and encrypts the signed address response with the public key associated with the verifier system 110 ($REG_{PUB}$) (to create an encrypted address response). The vehicle management system 130 then transmits the encrypted address response to the verifier system 110 over the communication network 150.

The verifier system 110 receives the encrypted address response, decrypts the encrypted address response with the verifier private key 190 ($REG_{PRI}$), and verifies the signed address response via the vehicle management public key 195 ($OEM_{PUB}$). As noted above, the verifier system 110 may verify the signed address response by decrypting the signed address response with the vehicle management public key 195 ($OEM_{PUB}$) and confirming that the nonce returned in the address response is the nonce originally sent by the verifier system 110.

It should be understood that that the address request described above may be an optional part of the method 400. For example, in some aspects, the verifier system 110 may have access the address of the vehicle 125 (e.g., the ECU master 120) and may not need to request the address from the vehicle management system. Also, even in situations where the address of the vehicle 125 is maintained external to the verifier system 110, the verifier system 110 may access or request the address in various ways and, in particular, aspects described herein are not limited to using the address request as described herein.

Returning to FIG. 4, in response to receiving (and optionally verifying) the requested vehicle address (at block 405), the verifier system 110 issues a digital shadow request to the vehicle 125 using the information received in the address response from the vehicle management system 130 (at block 410). Again, the sequence diagram in FIG. 5 provides further details regarding the digital shadow command. In particular, as illustrated in FIG. 5, to create the digital shadow request, the verifier system 110 generates a random seed (at block 465) and includes the random seed in the digital shadow request. The digital shadow request also includes the random seed signed with the verifier private key 190 ($REG_{PRI}$) (to create a signed digital shadow request), and transmits, to the address of the vehicle 125 (the address $ADR_{VIN}$ of the ECU master 120), the signed digital shadow request to the ECU master 120, such as, for example, via the communication network 150. Again, as noted above, the use of digital signatures is optional.

As illustrated in FIG. 4, in response to receiving a digital shadow ($DS_{VEH}$) from the vehicle 125 (the ECU master 120) as a response to the digital shadow request (at block 415), the verifier system 110 issues another (a second) digital shadow request to the digital twin 140 (at block 420). Again, the sequence diagram in FIG. 5 provides further details regarding the digital shadow command issued to the digital twin 140. As illustrated in FIG. 5, to create the second digital shadow request for the digital twin 140, the verifier system 110 includes the previously-generated random seed in the second request as well as the seed signed with the verifier private key 190 ($REG_{PRI}$) (to create a signed second digital shadow request), and transmits, to the digital twin 140, the signed second digital shadow request to the digital twin 140. In some aspects, rather than requesting the digital shadow serially (waiting until a digital shadow is successfully received from the vehicle 125), the verifier system 110 may request the digital shadows in parallel or at least in an overlapping fashion. However, waiting until a digital shadow is received from the vehicle 125 may avoid making requests to the digital twin 140 in situations where the vehicle 125 may not have access to the communication network 150 for communicating with the verifier system 110.

As illustrated in FIG. 5, in response to receiving a digital shadow ($DS_{DT}$) from the digital twin 140 (a second digital shadow) (at block 425), the verifier system 110 determines whether the first digital shadow ($DS_{VEH}$) received from the ECU master 120 matches the second digital shadow ($DS_{DT}$) received from the digital twin 140 (at block 430). In response to the first digital shadow matching the second digital shadow (at block 430), the verifier system 110 sets (records, flags, or the like) the vehicle 125 as passing software attestation (at block 435). Alternatively, in response to the first digital shadow not matching the second digital shadow (at block 430), the verifier system 110 sets the vehicle 125 as failing software attestation (at block 440).

Algorithm 1: Remote Attestation with Digital Shadow

```
Input: VIN
Output: {PASS, FAIL}
begin
   Generate random NONCE
   SIGN_OEM = Sign(REG_PRI; VIN || NONCE)
   Send Encrypt(OEM_PUB; VIN || NONCE || SIGN_OEM) to OEM
   Get ADR_VIN from OEM
   Decrypt using REG_PRI, verify using OEM_PUB
   Generate random SEED
   Send SEED, Sign(REG_PRI; SEED) to ADR_VIN
   Get encrypted DS_VEH from ADR_VIN
   Send SEED, Sign(REG_PRI; SEED) to OEM (digital twin 140)
   Get encrypted DS_DT from OEM
   if Decrypt(REG_PRI; DS_VEH) = Decrypt(REG_PRI; DS_DT) then
      Return PASS
   else
      Return FAIL
   end
end
```

As described above, a digital shadow is a cryptographically unique one-way identifier of the software image of a vehicle. An identical value of the digital shadow is derived from the ECU present in a vehicle and from the digital twin when the software installed on each match. As the digital shadow is encrypted and a one-way identifier, the digital shadow can be shared with an untrusted authority as well as over untrusted networks while not divulging sensitive information about the ECU (the complete software definition), an adversary is not capable of determining the digital shadow fingerprint without the software, and an adversary cannot determine the software from knowledge of the digital shadow or the algorithm.

Figure 6:
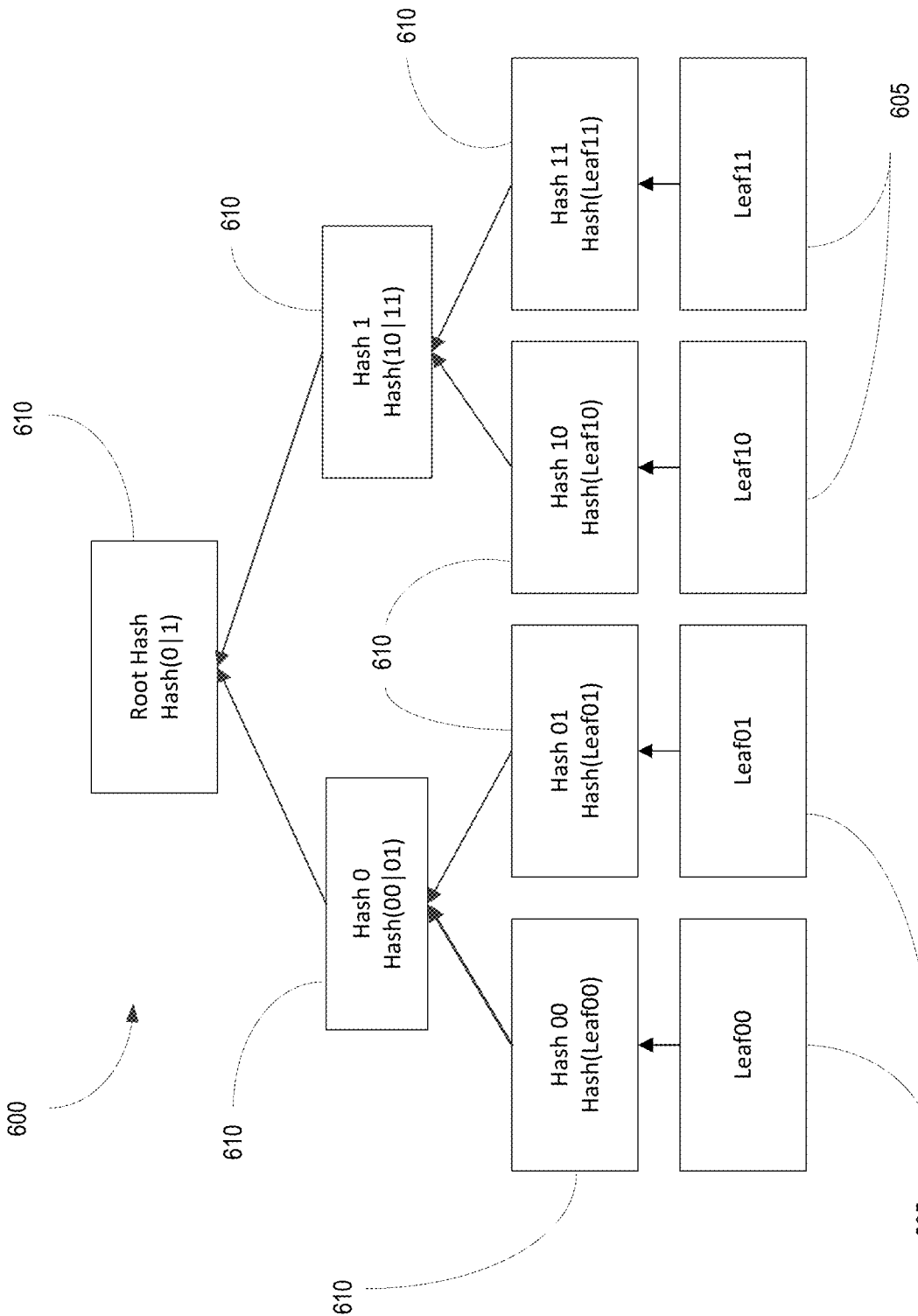
FIG. 6 schematically illustrates an example Merkle tree in accordance with some aspects.

In some aspects, the ECU master 120 and the digital twin 140 create a digital shadow of their respective memory space using for example, a message authentication code (MAC), a checksum, error detection code, hash, keyed hash, or the like of the program memory space, wherein the resulting identifier is encrypted with the unique device key 225. In some aspects, the ECU master 120 and the digital twin 140 each create a single digital shadow that represents not only the program memory space 230, 330 of the ECU master 120 and the digital twin 140, respectively, but also the program memory of the one or more other ECUs 155 included in the vehicle 125. In some aspects, the ECU master 120 and the digital twin 140 use a Merkle Tree to create a digital shadow representing the software space of multiple ECUs. As noted above, a Merkle tree allows for efficient and secure verification of the contents of a data structure and, in particular, as illustrated in FIG. 6, is a tree 600 in which every leaf node (referred to collectively as "leaf nodes" 605 and individually as "leaf node 605") represents a cryptographic hash of a data block, and every node that is not a leaf node (a parent node, referred to collectively as "parent nodes 610" and individually as "parent node 610") is labeled with the cryptographic hash of a data and the labels of its child nodes, such as, for example, by concatenating the hashes.

For example, with each node of a Merkle tree representing an ECU within a vehicle architecture of ECUs, a cryptographically unique one-way identifier of the memory space of the ECU represented by each leaf node is generated using a unique device key associated with the represented ECU and this generated node identifier is transmitted to each parent node of the leaf node. Each parent node concatenates the node identifier received from each child node with a similar identifier determined for the ECU represented by the parent node to create, using a unique device key of the ECU represented by the parent node, a node identifier for the parent node. The node identifier created by the top node in the tree (the node with no parent nodes) represents the digital shadow of the vehicle software image and is transmitted to the verifier system 110.

Figure 7A:
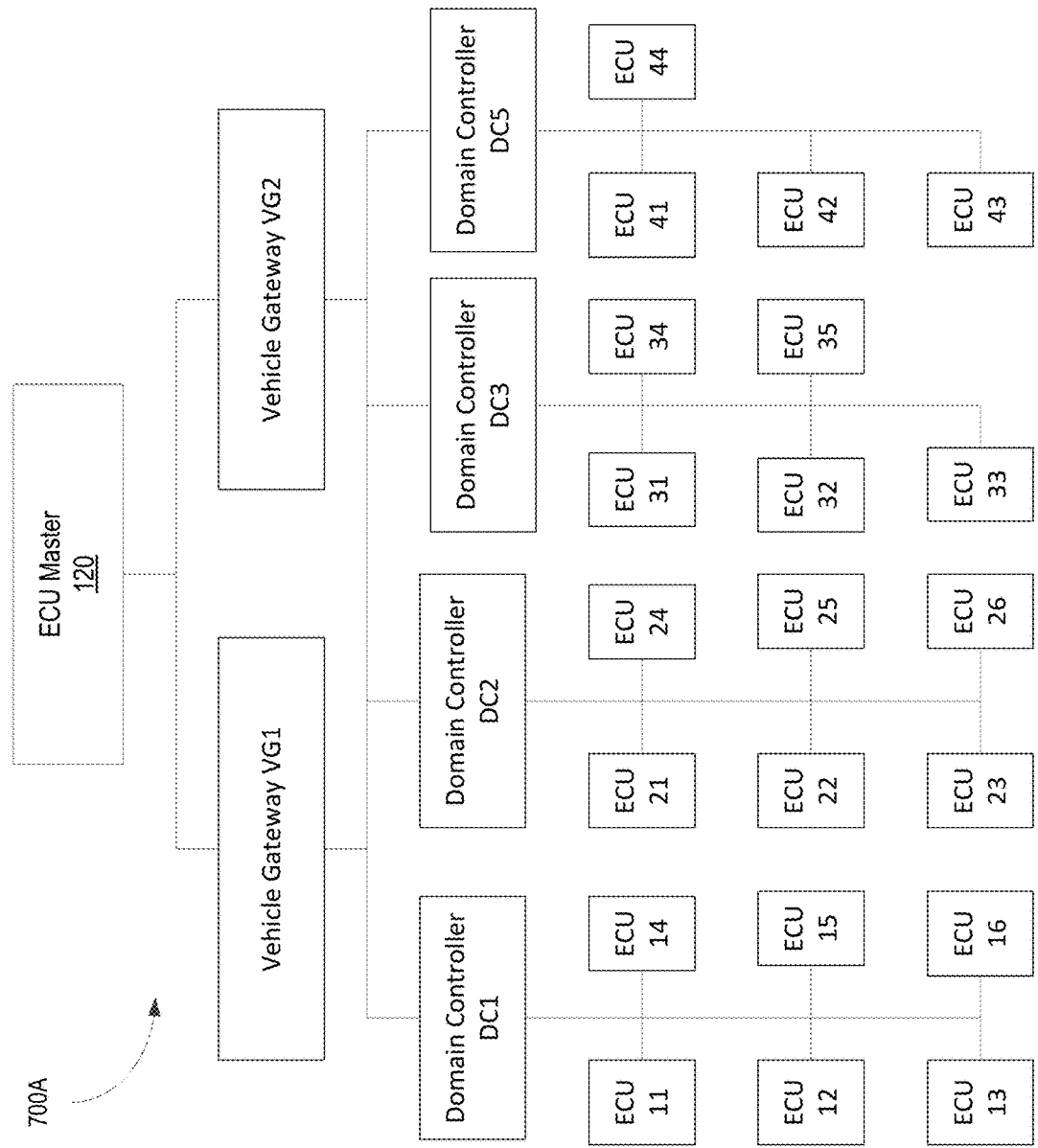
FIG. 7A and FIG. 7B each schematically illustrate an architecture of vehicle electronic control units represented as nodes in example Merkle trees, in accordance with some aspects.
Figure 7B:
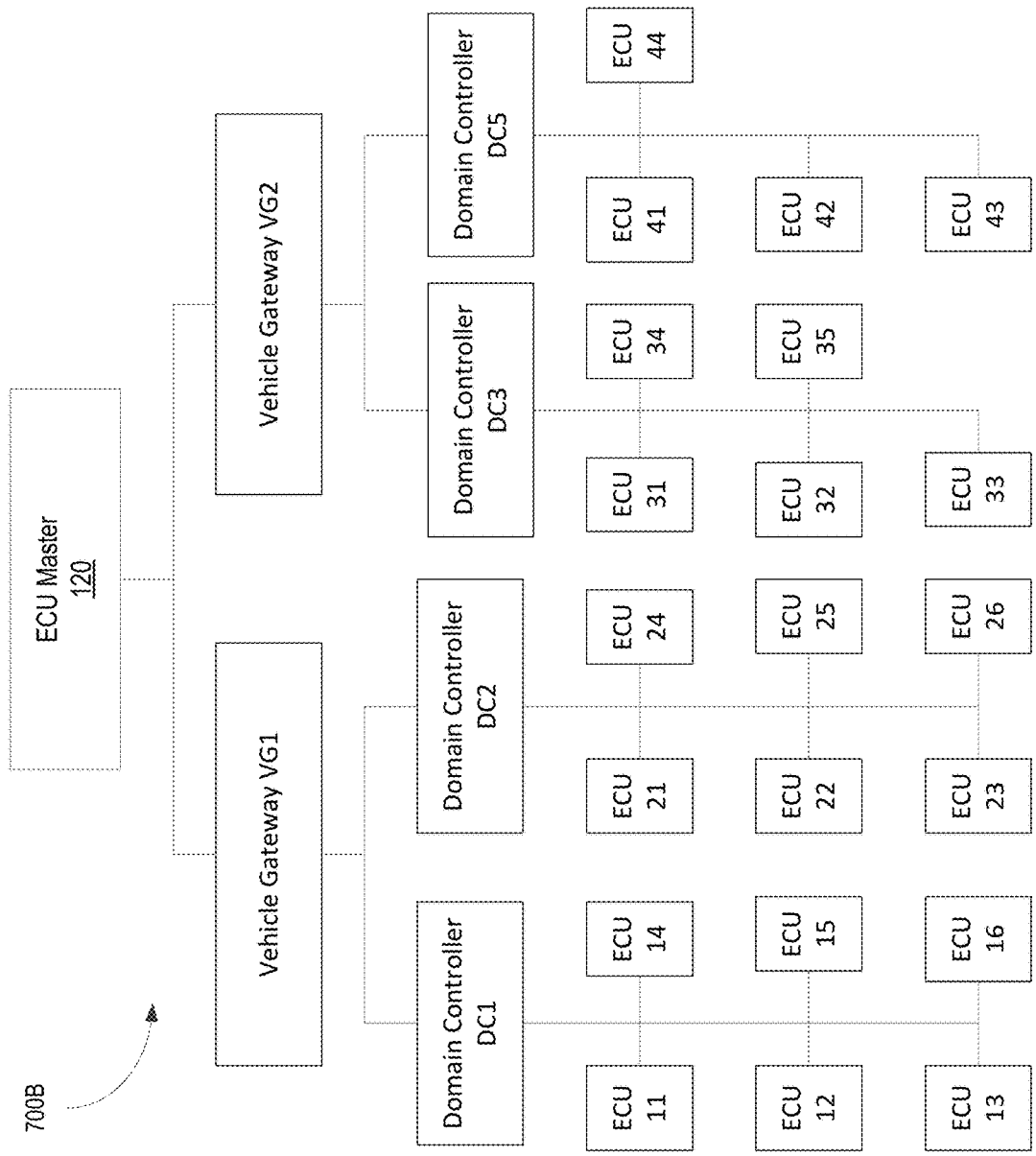

FIG. 7A and FIG. 7B each schematically illustrate an architecture of vehicle ECUs represented as nodes in Merkle trees 700A and 700B, respectively, in accordance with some aspects. FIG. 7A illustrates an example Merkle tree 700A that organizes vehicle ECUs in a domain-based vehicle architecture, wherein vehicle gateway 1 (VG1) and vehicle gateway 2 (VG2) redundantly control the same domain controllers (DCs) (represented as DC1, DC2, DC3, and DC4). As illustrated in FIG. 7A, each of the domain controllers (DC1, DC2, DC3, and DC4) control a distinct set of vehicle ECUs.

Using the example Merkle tree 700A, hashes would be created as specified via the below generalized equations:

$hE_{xx} = hash(ECU_{xx})$ $hD_x = hash(DC_x|hEx1| \ldots |hExe_d)$ $DC_x$ has $e_d$ children $hV1 = hash(VG1|hDC1| \ldots hDC4)$ $hV2 = hash(VG2|hDC1| \ldots hDC4)$ ECU master 120 verifies $hV1 = hV2$ $DS = hash(h(ECU\ master)|hV1)$ As illustrated in the above generalized equations, as the VG1 and VG2 redundantly control the same DCs, they should generate the same hash as provided to the ECU master 120. Accordingly, the ECU master 120 can verify that the hashes received from the VG1 and VG2 match and, in response to the hashes matching, the ECU master 120 can create the final hash (digital shadow) using one of the hashes (e.g., the hash from VG1).

FIG. 7B illustrates an example Merkle tree 700B that organizes vehicle ECUs in a domain-based vehicle architecture, wherein VG1 and VG2 independently control redundantly different DCs. Using the example Merkle tree 700B, hashes would be created as specified via the below generalized equations:

$hE_{xx} = hash(ECU_{xx})$ $hD_x = hash(DC_x|hEx1| \ldots |hExe_d)$ $DC_x$ has $e_d$ children $hV1 = hash(VG1|hDC1| \ldots hDC2)$ $hV2 = hash(VG2|hDC3| \ldots hDC3)$ $DS = hash(h(ECU\ master)|hV1|hV2)$ It should be understood that the vehicle architectures and associated Merkle trees illustrated in FIGS. 7A and 7B represent example architectures and tress and other architectures and tress configurations are possible.

Figure 8:
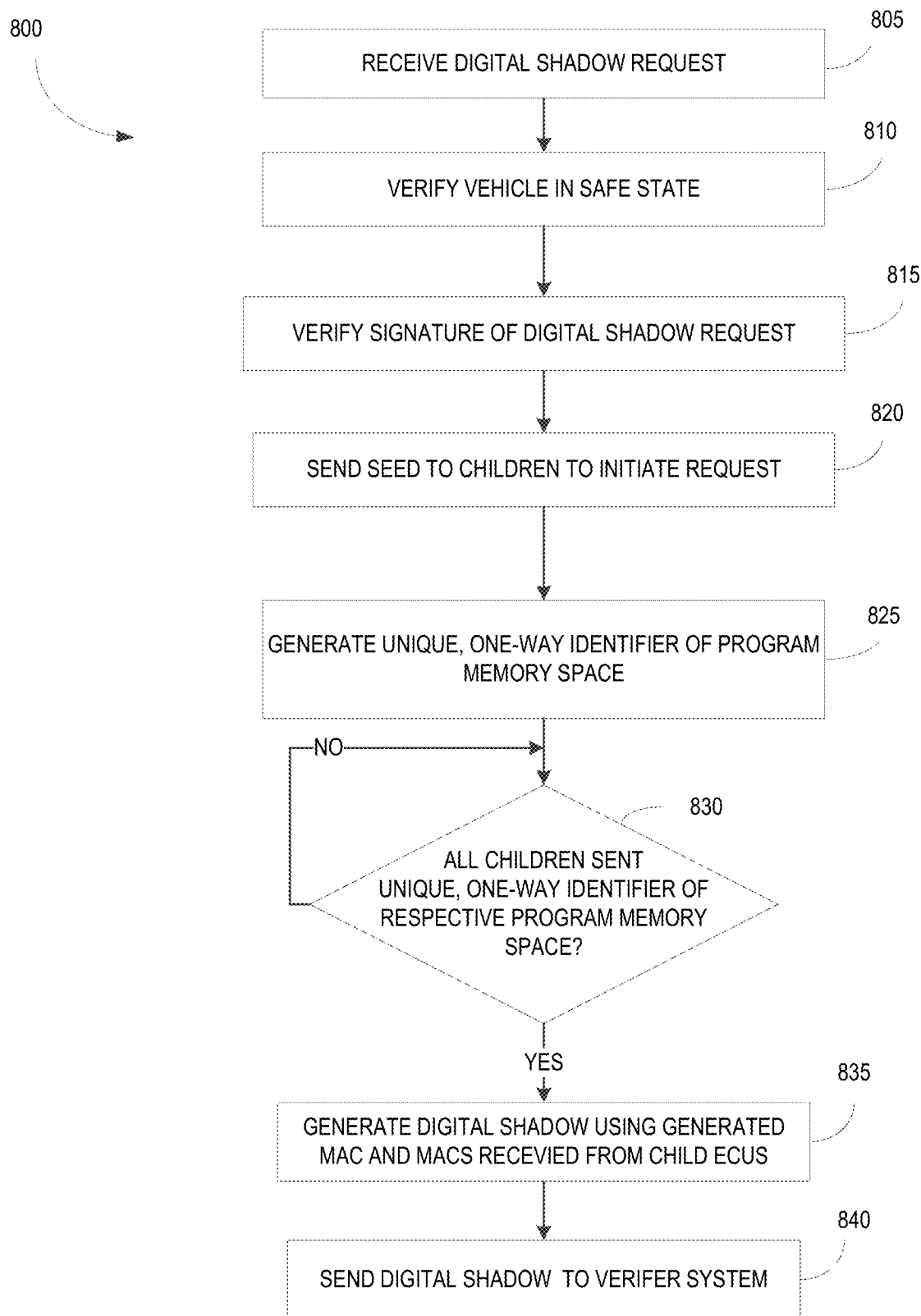
FIG. 8 is a flowchart of an example method of creating a digital shadow, in accordance with some aspects.

Using a Merkle tree as described above representing an architecture of ECUs included in the vehicle 125 allows the ECU master 120 and the associated digital twin 140 to generate a digital shadow for transmission to the verifier system 110 that represents the software image of multiple ECUs included in the vehicle 125. FIG. 8 is a flowchart of an example method 800 of creating a digital shadow. Algorithms 2 and 3 set forth below provide further details regarding the method 800 and, in particular, the generation of a digital shadow by an ECU. For sake of brevity, the method 800 is described herein as being performed by the ECU master 120 and, in particular, via the electronic processor 200 executing the digital shadow program 215. However, it should be understood that a similar method 800 can be performed via the digital twin 140 (via the electronic processor 300 executing the digital shadow program 215) to create a digital shadow that matches the digital shadow created via the ECU master 120 when the software image of the ECUs matches the corresponding software image of the ECUs maintained in the digital twin 140.

As illustrated in FIG. 8, the method 800 includes receiving, with the ECU master 120, at block 805, a digital shadow request from the verifier system 110 (as issued at block 410 described above with respect to FIG. 4). As described above with respect to FIGS. 4 and 5, in some aspects, the digital shadow request includes the seed generated by the verifier system 110 and the generated seed signed (encrypted) with the verifier private key 190 ($REG_{PRI}$).

As illustrated in FIG. 8, in some aspects, in response to receiving the digital shadow request, the ECU master 120 verifies that the vehicle 125 is in a predetermined state before processing the digital shadow request (at block 810). The predetermined state may be a "safe" state where processing power can be used to create a digital shadow, when a communication network (or a particular status of a communication network is available), when a software update is not in process, when the vehicle 125 is operating in a particular operating mode, when the vehicle is experiencing or not experiencing a particular operating event, or a combination thereof.

After optionally confirming that the vehicle 125 is in the predetermined state (at block 810), the ECU master 120 may verify the signature of the digital shadow request (at block 815). As described above, in some aspects, the digital shadow request includes the seed generated by the verifier system 110 and the generated seed encrypted with the verifier private key 190 ($REG_{PRI}$). Accordingly, the ECU master 120 can verify the received digital shadow request by decrypting the encrypted seed with the verifier public key 220 ($REG_{PUB}$). When the encrypted seed matches the unencrypted seed included in the request, the ECU master 120 verifies that the digital shadow request was generated by the verifier system 110 (and not an imposter). When the encrypted seed does not match the unencrypted seed, the ECU master 120 may reject the digital shadow request, such as by ignoring the request. In some aspects, the ECU master 120 may also alert the verifier system 110, the vehicle management system 130, or both regarding the rejected request. As noted above, the use of digital signatures is optional.

In response to the optionally verifying the digital shadow request (at block 815), the ECU master 120 sends the seed included in the digital shadow request to each child ECU (or other device) as represented within the applicable Merkle tree (at block 820). The ECU master 120 may maintain a list of child ECUs according to the applicable Merkle tree (e.g., identified by a unique identifier or other mechanism for identifying and communicating with the child ECUs) as well as a total number of such child nodes ($Num_{child}$), which allows the ECU master 120 to identify how many child ECUs the ECU master 120 must send the seed to and how many child ECUs should provide a response to the seed, which the ECU master 120 needs to build the requested digital shadow for the vehicle 125.

The ECU master 120 also generates a unique, one-way identifier, such as, for example, a message authentication code (MAC), for the program memory space 230 of the ECU master 120 (at block 825). To prevent the ECU master 120 (or a different) from submitting a previously-generated digital shadow to the verifier system 110 in response to the received request, the ECU master 120 generates the MAC of the program memory space 230 based on the seed included in the digital shadow request. In particular, the ECU master 120 generates the MAC of the program memory space 230 starting at the seed (a location within the program memory space 230 represented via the seed) and moving through the end of the program memory space 230 ($Num_{mem}$) before starting over at the beginning of the program memory space 230 ($l$). In some aspects, the ECU master 120 concatenates the data stored at each location of the program memory space 230 as the ECU master 120 steps through the program memory space 230 starting at the seed to generate a new, rearranged version of the program memory space 230 and then generates a MAC of the rearranged program memory space 230. Accordingly, the seed allows the verifier system 110 to ensure that the ECU master 120 generates a digital shadow of the current software image and does not just re-submit a previously-generated digital shadow (as the previously-generated digital shadow would likely have been generated using a different seed and, thus, would not match the digital shadow provided via the digital twin 140). Again, it should be understood that the use of a seed is optional. In situations where the digital shadow request does not include a seed, the ECU master 120 may transmit other data to each child ECU to trigger generation of a unique, one-way identifier of the program memory space of each child ECU, such as, for example, an identifier request. Accordingly, use of a random seed as described herein should not be considered limiting. Furthermore, although aspects described herein rearrange memory space consecutively, other, for example, pseudorandom patterns could be used. For example, in some aspects, ECU memory space may be rearranged by starting at a location corresponding to received seed and then skipping a predetermined number of memory locations (wherein multiple cycles through the memory are performed until all memory locations have been processed). Similarly, a received seed may be used to set the predetermined number of memory locations to skip (from a static or dynamic starting location) when rearranging the memory space. Also, it should be understood that, in some aspects, only a subset of memory locations are used to generate a digital shadow, which may reduce computation requirements on an ECU. Generating a digital shadow based on the full memory space, however, may identify software modifications that may otherwise be missed when only processing a portion of the memory space.

As illustrated in Algorithm 2 set forth below, in some embodiments, the unique, one-way identifier generated for the program memory space 230 ($MAC_{ECU}$) includes a MAC that is based on the unique device key 225 ($ECU_{KEY}$) of the ECU master 120. As also illustrated in Algorithm 2 and as noted above, the ECU master 120 not only generates a unique identifier for its own program memory space 230 but also generates a digital shadow representing the software image of a plurality of ECUs included in the vehicle 125. Creating this "global" digital shadow for the vehicle 125 reduces the number of communications needed between the ECU master 120 and the verifier system 110, which may be difficult given the availability of communication networks given the mobility of vehicle 125 and the fact that communication may only occur when the vehicle 125 is operating. Accordingly, after creating the identifier for the program memory space 230 ($MAC_{ECU}$), the ECU master 120 determines whether it has received a unique, one-way identifier (e.g., a $MAC_i$) for the corresponding program memory space of each child ECU (child $ECU_i$) that the ECU master 120 sent the seed (or a separate identifier request) to.

When a child ECU receiving the seed (or other type of identifier request) from the ECU master 120 has one or more child ECUs (according to the applicable Merkel tree), the child ECU generates a unique, one-way identifier (e.g., a MAC) for its corresponding program memory space similar to the ECU master 120 (e.g., by rearranging the program memory space according to the seed received from the ECU master 120 and generating a MAC of the rearranged program memory space using the unique device key of the child ECU) and also forwards the received seed (or other form of identifier request) to each child node ECU and awaits a response from the child node ECU similar to the ECU master 120.

Alternatively, when a child ECU receives the seed (or other type of identifier request) from a parent node ECU (e.g., the ECU master 120 or a different ECU) and the receiving child ECU does not have any child nodes ($Num_{child}=0$), the child ECU is considered a leaf node in the Merkel tree and generates a unique, one-way identifier (e.g., a MAC) of its program memory space using its unique device key similar to the ECU master 120 as described above with respect to block 830. However, as the leaf node ECU does not have any children, the child ECU in this situation does not forward the seed or a similar identifier request to any additional ECUs or await identifiers from any child ECUs. Rather, the leaf node ECU generates the unique, one-way identifier (e.g., a MAC based on the ECU's device key) and returns the generated identifier to each parent node ECU. Further details regarding one example of generating a unique, one-way identifier at a leaf node are presented below in Algorithm 3.

Returning to FIG. 8, in response to receiving an identifier for the memory space of each respective child ECU (at block 830), the ECU master 120 generates a digital shadow ($DS_{VEH}$) to respond to the digital shadow request received from the verifier system 110 (at block 835) and sends the generated digital shadow ($DS_{VEH}$) to the verifier system 110, such as via the communication network 150 (at block 840). In some aspects, the ECU master 120 generates the digital shadow by concatenating the generated MAC for the program memory space 230 ($MAC_{ECU}$) (as generated using the device key 225) with the generated MAC received from each child ECU ($MAC_1 \ldots MAC_{NumChild}$) (as generated using a unique device key of a child ECU) and generates a MAC of the resulting concatenation based on the unique device key 225 of the ECU master 120 ($MAC_{Node}$), which (because the ECU master 120 has no parent) is transmitted to the verifier system 110. As illustrated in FIG. 5, in some aspects, the ECU master 120 encrypts the generated digital shadow with the verifier public key 220 ($REG_{PUB}$) before sending the digital shadow to the verifier system 110, which secures the transmitted digital shadow as only the verifier system 110 (storing the verifier private key 190 ($REG_{PRI}$)) can decrypt the transmission and receive the generated digital shadow.

---
Algorithm 2: Build Parent Node MAC
---

Input: SEED
Output: $MAC_x$
Known: $Num_{Child}$, $ECU_{KEY}$, $Num_{Mem}$
begin
   Get SEED from Parent ECU (or digital shadow request when ECU master 120)
   for $i \in \{1,..., Num_{Child}\}$ do
     Send SEED to child $ECU_i$
   end
   $MAC_{ECU} \leftarrow MAC(ECU_{KEY}; ECU(SEED) \| ECU(SEED + 1) \|...\| ECU(Num_{Mem}) \| ECU(1) \|...\| ECU(SEED - 1))$
   for $i \in \{1,..., Num_{Child}\}$ do
     Get $MAC_i$ from child $ECU_i$
   end
   $MAC_{Node} \leftarrow MAC(ECU_{KEY}; MAC_{ECU} \| MAC_1 \|...\| MAC_{NumChild})$
   Send $MAC_{Node}$ to Parent (or verifier system 110 when no parent)
end ---
Algorithm 3: Build Leaf Mode MAC
---

Input: SEED
Output: $MAC_x$
KNOWN: $ECU_{KEY}$, $NUM_{MEM}$
begin
   Get SEED from Parent ECU
   $MAC_{ECU} \leftarrow MAC(ECU_{KEY}; ECU(SEED) \| ECU(SEED + 1) \|...\| ECU(Num_{Mem}) ECU(1) \|...\| ECU(SEED - 1))$
   $MAC_{Node} \leftarrow MAC(ECU_{KEY}; MAC_{ECU})$
   Send $MAC_{Node}$ to Parent
end As described above with respect to FIG. 4, the verifier system 110 receives the digital shadow from both the ECU master 120 and the digital twin 140 (as similarly generated per the method 800 described above) and compares the digital shadows (at block 430). As noted above, in some aspects, the digital shadow transmitted by the ECU master 120, the digital twin 140, or both may be encrypted with the verifier public key 220 before being transmitted to the verifier system 110. Accordingly, in some aspects, to compare the received digital shadows, the verifier system 110 may decrypt one or both digital shadows with the verifier private key 190.

When the digital shadow received from the ECU master 120 matches the digital shadow received from the digital twin 140, the verifier system 110 can confirm that the vehicle 125 has the software maintained in the digital twin 140 currently installed and, hence, can ensure that the vehicle 125 has appropriate software installed and does not include outdated software, malicious software, non-compliant software, or the like. In some aspects, in response to determining that the received digital shadows do not match, the verifier system 110 may record the issue and may, in some aspects, take additional actions, such as, for example, pushing a software update to the vehicle 125 either directly or via another system or device (e.g., the vehicle management system 130). Alternatively or in addition, the additional actions may include generating a notification (paper, electronic, or both) to be sent to the vehicle owner, vehicle management system 130, denying the vehicle 125 access to a resource, or a combination thereof. For example, in response to determining the received digital shadows do not match, the vehicle 125 may be denied access to a section of a highway or other roadway, denied access to external services or functions, such as, for example, navigation signals or vehicle-to-vehicle communications, denied access to one or more onboard vehicle services or functions, such as, for example, turning off one or more services or functions provided via one or more ECUs included in the vehicle 125, or a combination thereof.

Thus, the examples described herein provide, among other things, a vehicle software attestation. As compared to using sentinels, local clocks, or other software checking solutions, that may be easily circumvented or may not be scalable given processing power and communication requirements, the methods and systems described herein provide for efficient and effective remote software attestation over unreliable networks and in the face of low trust requirements. Accordingly, the methods and systems described herein provide technological advances over current attestation strategies.

In the foregoing specification, specific examples, aspects, and features have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Various features, aspects, advantages, and embodiments are set forth in the following claims.

What is claimed is:

1. A system for performing vehicle software attestation, the system comprising:
   an electronic control unit (ECU) master included in a vehicle; and
   a computing device of a verifier system, the computing device of the verifier system configured to:
     generate a random seed;
     generate a digital shadow request including the random seed, and
     transmit, to an address of the vehicle, the digital shadow request over a communication network, the ECU master configured to:
receive the digital shadow request,
generate a unique, one-way identifier of a program memory space of the ECU master based on the random seed,
receive a unique, one-way identifier of a program memory space of each of a plurality of other ECUs included in the vehicle,
generate a digital shadow based on the unique, one-way identifier of the program memory space of the ECU master and the unique, one-way identifier of the program memory space of each of the plurality of other ECUs, and
transmit the digital shadow to the verifier system as a response to the digital shadow request,
the computing device of the verifier system further configured to:
receive the digital shadow from the ECU master as a first digital shadow,
receive a second digital shadow from a digital twin representing software installed in the ECU master and each of the plurality of other ECUs,
determine whether the first digital shadow matches the second digital shadow, and
in response to the first digital shadow matching the second digital shadow, set the vehicle as passing software attestation.

2. The system of claim 1, wherein the computing device of the verifier system is further configured to obtain the address of the vehicle by:
generating an address request, the address request including an identifier of the vehicle,
signing the address request with a private key associated with the verifier system to create a signed address request,
encrypting the signed address request with a public key associated with a vehicle management system to create an encrypted address request, and
transmit the encrypted address request to a computing device of the vehicle management system.

3. The system of claim 2, wherein the computing device of the vehicle management system is configured to:
receive the encrypted address request,
decrypt the encrypted address request with a private key associated with the vehicle management system to obtain the signed address request,
verify the signed address request via a public key associated with the verifier system, and
in response to verifying the signed address request,
determine the address of the vehicle identified by the identifier included in the address request,
generate an address response, the address response including the address of the vehicle,
sign the address response with the private key associated with the vehicle management system to generate a signed address response,
encrypt the signed address response with the public key associated with the verifier system to create an encrypted address response, and
transmit the encrypted address response to the verifier system.

4. The system of claim 3, wherein the computing device of the verifier system is further configured to:
receive the encrypted address response,
decrypt the encrypted address response with the private key associated with the verifier system to obtain the signed address response,
verify the signed address response via the public key associated with the vehicle management system, and
generate the first digital shadow using the address included in the address response in response to verifying the signed address response.

5. The system of claim 1, wherein the ECU master is configured to generate the unique, one-way identifier of the program memory space of the ECU master based on the random seed by generating a message authentication code of the program memory space of the ECU master starting from the random seed through an end of the program memory space of the ECU master and then starting at a beginning of the program memory space.

6. The system of claim 1, wherein computing device of the verifier system is further configured to sign the digital shadow request with a private key of the verifier system to create a signed digital shadow request and wherein the ECU master is configured to verify the signed digital shadow request using a public key of the verifier system.

7. The system of claim 1, wherein the ECU master is further configured to, in response to receiving the digital shadow request, verify that the vehicle is in a predetermined mode.

8. The system of claim 1, wherein the ECU master is further configured to request the unique, one-way identifier from each of the plurality of other ECUs by transmitting a random seed included in the digital shadow request to each child ECU of the ECU master as represented within a tree structure of an architecture of the vehicle.

9. The system of claim 8, wherein the tree structure includes a Merkel tree.

10. The system of claim 8, wherein the ECU master is configured to generate the first digital shadow by generating a message authentication code of a concatenation the unique, one-way identifier received from each child ECU with the unique, one-way identifier of the program memory space of the ECU master.

11. The system of claim 8, wherein the unique, one-way identifier of the program memory space of the ECU master includes a message authentication code of the program memory space of the ECU master based on a unique device key of the ECU master.

12. The system of claim 1, wherein the computing device of the verifier system is further configured to generate a second digital shadow request and transmit the second digital shadow request to the digital twin, wherein the digital twin transmits the second digital shadow to the verifier system as a response to the second digital shadow request.

13. The system of claim 12, wherein the computing device of the verifier system generates and transmits the second digital shadow request in response to receiving the first digital shadow from the ECU master.

14. A method for performing vehicle software attestation, the method comprising:
receiving, at an electronic control unit (ECU) master included in a vehicle, a digital shadow request from a verifier system, the digital shadow request including a random seed generated by the verifier system;
generating, with the ECU master, a unique, one-way identifier of a program memory space of the ECU master based on the random seed,
receiving, at the ECU master, a unique, one-way identifier of a program memory space of each of a plurality of other ECUs included in the vehicle;
generating, with the ECU master, a digital shadow based on the unique, one-way identifier of the program memory space of the ECU master and the unique, one-way identifier of the program memory space of each of the plurality of other ECUs; and transmitting, with the ECU master, the digital shadow to the verifier system over a communication network as a response to the digital shadow request.

15. The method of claim 14, further comprising:

receiving, at the verifier system, the digital shadow from the ECU master as a first digital shadow;

receiving, at the verifier system, a second digital shadow from a digital twin representing software installed in the ECU master and each of the plurality of other ECUs;

determining, with the verifier system, whether the first digital shadow matches the second digital shadow; and in response to the first digital shadow matching the second digital shadow, setting the vehicle as passing software attestation.

16. The method of claim 14, wherein generating the unique, one-way identifier of the program memory space of the ECU master includes rearranging the program memory space of the ECU master based on the random seed included in the digital shadow request and generating the unique, one-way identifier of the program space of the ECU master as rearranged.

17. Non-transitory computer-readable medium storing instructions, which when executed by an electronic processor, cause the electronic processor to perform a set of functions, the set of functions comprising:

receiving a digital shadow request from a verifier system, the digital shadow request including a random seed generated by the verifier system; and in response to receiving the digital shadow request:

generating a unique, one-way identifier of a program memory space of an electronic control unit (ECU) master included in a vehicle based on the random seed, receiving a unique, one-way identifier of a program memory space of each of a plurality of other ECUs included in the vehicle, generating a digital shadow based on the unique, one-way identifier of the program memory space of the ECU master and the unique, one-way identifier of the program memory space of each of the plurality of other ECUs, and transmitting the digital shadow to the verifier system over a communication network as a response to the digital shadow request.

18. The non-transitory computer-readable medium of claim 17, wherein generating the unique, one-way identifier of the program memory space of the ECU master includes rearranging the program memory space of the ECU master based on the random seed included in the digital shadow request and generating the unique, one-way identifier of the program space of the ECU master as rearranged.

* * * * *